(12) United States Patent
Zeng et al.

(10) Patent No.: US 9,811,578 B2
(45) Date of Patent: Nov. 7, 2017

(54) MULTIDIMENSIONAL DATA PROCESS METHOD AND DEVICE THEREOF

(71) Applicant: TENCENT TECHNOLOGY (SHENZHEN) COMPANY LIMITED, Shenzhen, Guangdong Province (CN)

(72) Inventors: Wei Ji Zeng, Shenzhen (CN); Hao Li, Shenzhen (CN); Lei Wu, Shenzhen (CN); Fu Han Cai, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 344 days.

(21) Appl. No.: 14/656,607

(22) Filed: Mar. 12, 2015

(65) Prior Publication Data
US 2015/0213108 A1    Jul. 30, 2015

Related U.S. Application Data

(63) Continuation of application No. PCT/CN2014/082824, filed on Jul. 23, 2014.

(30) Foreign Application Priority Data

Aug. 16, 2013    (CN) .................... 2013 1 0357625

(51) Int. Cl.
G06F 17/30    (2006.01)

(52) U.S. Cl.
CPC .... G06F 17/30592 (2013.01); G06F 17/3053 (2013.01); G06F 17/30312 (2013.01); G06F 17/30333 (2013.01); G06F 17/30513 (2013.01)

(58) Field of Classification Search
CPC ............ G06F 17/509; G06F 17/30312; G06F 17/30333; G06F 17/30513; G06F 17/3053; G06F 17/30592
See application file for complete search history.

(56) References Cited

U.S. PATENT DOCUMENTS 6,424,967 B1    7/2002 Johnson et al.
2007/0112803 A1*    5/2007 Pettovello ......... G06F 17/30094
(Continued)

FOREIGN PATENT DOCUMENTS

CN    102467559 A    5/2012
EP    2290594 A1    3/2011

*Primary Examiner* — Angelica Ruiz
(74) *Attorney, Agent, or Firm* — Anova Law Group, PLLC (57) ABSTRACT

A multidimensional data process method and device thereof are disclosed in the present embodiments. The method comprises: obtaining attribute information in dimension information and hierarchical relationship information of respective attributes in a data service, and generating a recursive topology; and the recursive topology comprises an attribute composition set and recursive paths of respective attribute compositions in the attribute composition set; confirming attribute compositions for querying in the attribute composition set; confirming attribute compositions for fixing in the attribute composition set according to the attribute compositions for querying; fixing the attribute compositions for fixing to form fixed attribute compositions and obtaining index data in accordance with the fixed attribute compositions; recursing index data in accordance with the attribute compositions for querying. The present invention is applied to the multidimensional data analysis.

20 Claims, 6 Drawing Sheets

(56) References Cited

U.S. PATENT DOCUMENTS

| | | | |
|---|---|---|---|
| 2009/0316602 A1* | 12/2009 | Nandy | H04L 45/02 370/254 |
| 2011/0010226 A1 | 1/2011 | Guild et al. | |
| 2011/0054860 A1 | 3/2011 | Guild et al. | |
| 2011/0199938 A1* | 8/2011 | Kompella | H04L 45/02 370/254 |
| 2012/0089721 A1* | 4/2012 | Day | H04L 41/145 709/223 |
| 2013/0242804 A1* | 9/2013 | Yabusaki | H04L 41/0893 370/255 |

\* cited by examiner

MULTIDIMENSIONAL DATA PROCESS METHOD AND DEVICE THEREOF

CROSS REFERENCE TO RELATED APPLICATION

This application is a continuation of International Application No. PCT/CN2014/082824, filed Jul. 23, 2014, which claims priority to CN2013103576225 filed on Aug. 16, 2013.

FIELD OF THE TECHNOLOGY

The present disclosure relates to the field of computer technology, and more particularly to a multidimensional data process method and a device thereof.

BACKGROUND

With the constant development of computer technology, the multidimensional data analysis has been used widely in various data analysis platforms. The multidimensional data analysis is developed from OLAP (On-Line Analytical Processing) technology and the core of the OLAP. The purpose is to observe and analyze index variations from multi-dimensions to emphasize the demonstration of the obtained index data by some selected important dimensions.

In traditional OLAP service, two query service strategies are provided in general. One way is that some predetermindedly fixed attribute compositions, i.e. some attribute compositions are predetermindely set and index data in accordance with the attribute compositions is obtained. When the query is received, the index data will be directly demonstrated to the user if the query comprises the attribute compositions. If the query does not comprise the predetermindely fixed attribute compositions, then no query service is provided. The other way is that no predetermindely fixed attribute compositions exist, and the calculation is executed starting from the stream-oriented data according to the attribute compositions in the query after receiving the query.

Nowadays, dimensions and attributes of every dimension become more and more with the increase of the stream-oriented data. The computing cost is high and the computing complexity is high under circumstance that index data of the respective attribute compositions is obtained by starting from the stream-oriented data.

SUMMARY

The embodiments of the present invention provide a multidimensional data process method and a device thereof for solving the issues that the computing cost and complexity are high because the index data of respective attribute compositions are obtained based on the stream-oriented data.

For achieving the aforesaid objective, the present invention, the following technical scheme is adopted by the invention:

A multidimensional data process method may include:

obtaining attribute information in dimension information and hierarchical relationship information of respective attributes in a data service, and generating a recursive topology according to the attribute information in the dimension information and the hierarchical relationship information of the respective attributes; and the recursive topology comprises an attribute composition set and recursive paths of respective attribute compositions in the attribute composition set;

confirming attribute compositions for querying in the attribute composition set;

confirming attribute compositions for fixing in the attribute composition set according to the attribute compositions for querying;

fixing the attribute compositions for fixing to form fixed attribute compositions and obtaining index data in accordance with the fixed attribute compositions;

recursing index data in accordance with the attribute compositions for querying according to the recursive paths and the index data in accordance with the fixed attribute compositions.

A multidimensional data process device may include:

an obtaining unit, obtaining attribute information in dimension information and hierarchical relationship information of respective attributes in a data service;

a generating unit, generating a recursive topology according to the attribute information in the dimension information and the hierarchical relationship information of the respective attributes obtained by the obtaining unit; and the recursive topology comprises an attribute composition set and recursive paths of respective attribute compositions in the attribute composition set;

a confirming unit, confirming attribute compositions for querying in the attribute composition set generated by the generating unit;

the confirming unit, is also employed for confirming attribute compositions for fixing in the attribute composition set according to the attribute compositions for querying;

a fixing unit, fixing the attribute compositions for fixing confirmed by the confirming unit to form fixed attribute compositions and obtaining index data in accordance with the fixed attribute compositions;

a recursing unit, recursing index data in accordance with the attribute compositions for querying according to the recursive paths generated by the generating unit and the index data in accordance with the fixed attribute compositions fixed by the fixing unit.

According to the multidimensional data process method and the device thereof provided by the embodiments of the present invention, the attribute compositions for querying are confirmed and the attribute compositions for fixing are confirmed with the attribute compositions for querying. The attribute compositions for fixing are fixed to form fixed attribute compositions. The index data in accordance with the fixed attribute compositions is obtained from the stream-oriented data. Accordingly, the index data in accordance with the attribute compositions for querying is obtained by recursing the index data in accordance with the attribute compositions for querying according to the generated recursive topology rather than obtaining from the stream-oriented data. The computing cost is lower and the computing complexity is lower, too. In conventional method, the index data is obtained from the stream-oriented data each time. Therefore, both the computing cost and complexity are high. Thus, the present disclosure is capable of solving issues that the computing cost and complexity are high because the index data of respective attribute compositions are obtained based on the stream-oriented data.

BRIEF DESCRIPTION OF THE DRAWINGS

For more apparently explaining the skill solutions in the embodiments of the present invention and the prior arts, simple descriptions for the figures required for describing the embodiments of the present invention and the prior arts are introduced below. Obviously, the figures described here are merely some embodiments of the present invention. To those who are ordinarily skilled in the art, other figures can be derived according to these figures under the premise without creative efforts.

DETAILED DESCRIPTION OF PREFERRED EMBODIMENTS

The present invention will now be described more specifically with reference to the following embodiments below. It is clear that the described embodiments are merely part of embodiments of the present invention, but not all embodiment cases. Based on the embodiments of the present invention, all the other embodiments obtained by those who are ordinarily skilled in the art without creative effort should belong to the protected scope of the present invention.

For a better understanding the objective, characteristics and benefits of the present invention, preferable embodiments are illustrated in accordance with the attached figures for further explanation.

Figure 1:
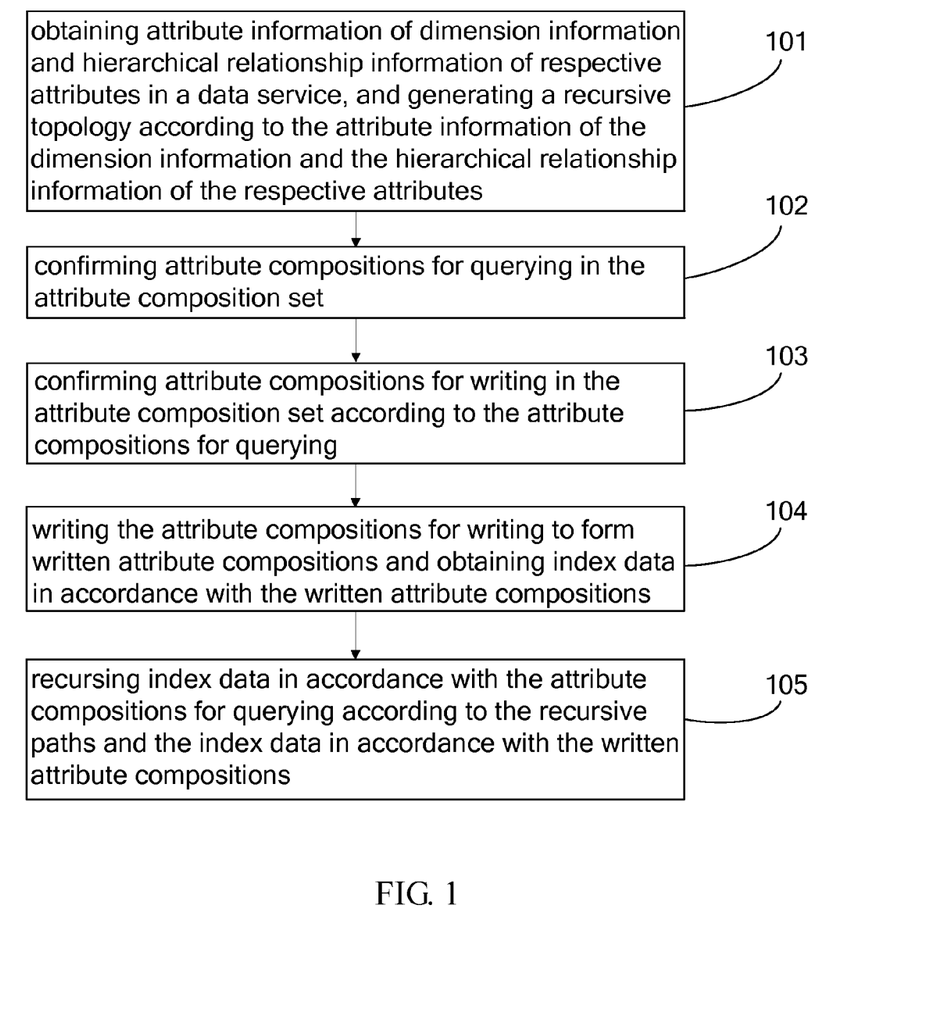
FIG. 1 is a flow chart illustrating a multidimensional data process method provided by an embodiment of the present invention.

As shown in FIG. 1, a multidimensional data process method provided by an embodiment of the present invention comprises:

101. obtaining attribute information in dimension information and hierarchical relationship information of respective attributes in a data service, and generating a recursive topology according to the attribute information in the dimension information and the hierarchical relationship information of the respective attributes.

The recursive topology comprises an attribute composition set and recursive paths of respective attribute compositions in the attribute composition set. The recursive topology can be employed for recursing index data in accordance with the attribute compositions for querying according to index data in accordance with fixed attribute compositions in the recursive topology as querying the attribute compositions for querying. In a multidimensional data analysis, the attribute composition is generally composed by attributes of multi-dimensions. The dimension is considered as an angle of analyzing data. For instance, as some application program is used, the districts, ages of users of the application program users are the dimensions. The attribute information is the scale of describing the dimension in the same dimension, such as a time dimension which can comprises day, week, month year and et cetera. The hierarchical relationship information of the respective attributes comprises hierarchical relationships of the respective attributes. As an illustration, in a district dimension, a country may have many provinces. A province can have many cities. For example, China has many provinces, such as Guangdong Province, Guangxi Province and et cetera. Guangdong Province has Shenzhen City, Guangzhou City, Dongguan City and et cetera.

102. confirming attribute compositions for querying in the attribute composition set.

Specifically, the step is to obtain query statistics of the respective attribute compositions queried in a predetermined period of time. Accordingly, the attribute compositions for querying can be obtained according to the query statistics of the respective attribute compositions which have been queried. For instance, the attribute compositions which are queried with higher frequency in the query statistics can be the attribute compositions for querying.

103. confirming attribute compositions for fixing in the attribute composition set according to the attribute compositions for querying. In the embodiment, the aforesaid fixing means pre-calculation and storing operation. This is to say, after performing a pre-calculating (such as an adaptive computation) on the attribute compositions, the attribute compositions can be written in a storage system. When the attribute compositions, which have been previously written in the storage system, are queried, a query result can be directly returned. Instead, while the attribute compositions, which have not been pre-calculated and written in the storage system are queried, a rollup calculation starting from parent attribute compositions becomes a must and a certain burden of calculation is necessary. Even more, under circumstance that the parent attribute compositions have not been pre-calculated and written, a calculation starting from stream-oriented data which can cause a massive burden of calculation becomes unavoidable.

Practically, the attribute compositions for fixing are meant for forming the fixed attribute composition after and obtaining index data in accordance with the fixed attribute composition from the stream-oriented data. In the recursive topology, massive attribute compositions exist. The attribute compositions for fixing can be confirmed according to the weights of the attribute composition for querying and the penalties of the respective attribute compositions scrolled to the attribute composition for querying.

104. fixing the attribute compositions for fixing to form fixed attribute compositions and obtaining index data in accordance with the fixed attribute compositions.

105. recursing index data in accordance with the attribute compositions for querying according to the recursive paths and the index data in accordance with the fixed attribute compositions.

The preferable attribute compositions for fixing have been confirmed according to the attribute compositions for querying. Then, the fixed attribute compositions are formed and the index data in accordance with the fixed attribute compositions is obtained from the stream-oriented data. When asking the index data in accordance with the attribute compositions for querying, the index data can be recursed according to the index data in accordance with the fixed attribute compositions. The step of recursing index data in accordance with the attribute compositions for querying according to the recursive paths and the index data in accordance with the fixed attribute compositions can be triggered when the querying instruction is received but not limited to the present invention.

Significantly, the executing subject of the multidimensional data process method provided by the embodiment of the present invention can be a multidimensional data process device. The multidimensional data process device can function on electronic equipments, such as computers, network servers and et cetera but not limited thereto.

According to the multidimensional data process method provided by the embodiment of the present invention, the attribute compositions for querying are confirmed and the attribute compositions for fixing are confirmed with the attribute compositions for querying. The attribute compositions for fixing are fixed to form fixed attribute compositions. The index data in accordance with the fixed attribute compositions is obtained from the stream-oriented data. Accordingly, the index data in accordance with the attribute compositions for querying is obtained by recursing the index data in accordance with the attribute compositions for querying according to the generated recursive topology rather than obtaining from the stream-oriented data. The computing cost is lower and the computing complexity is lower, too. In prior art, the index data is obtained from the stream-oriented data each time. Therefore, both the computing cost and complexity are high. Thus, the present invention is capable of solving issues that the computing cost and complexity are high because the index data of respective attribute compositions are obtained based on the stream-oriented data.

Figure 2A:
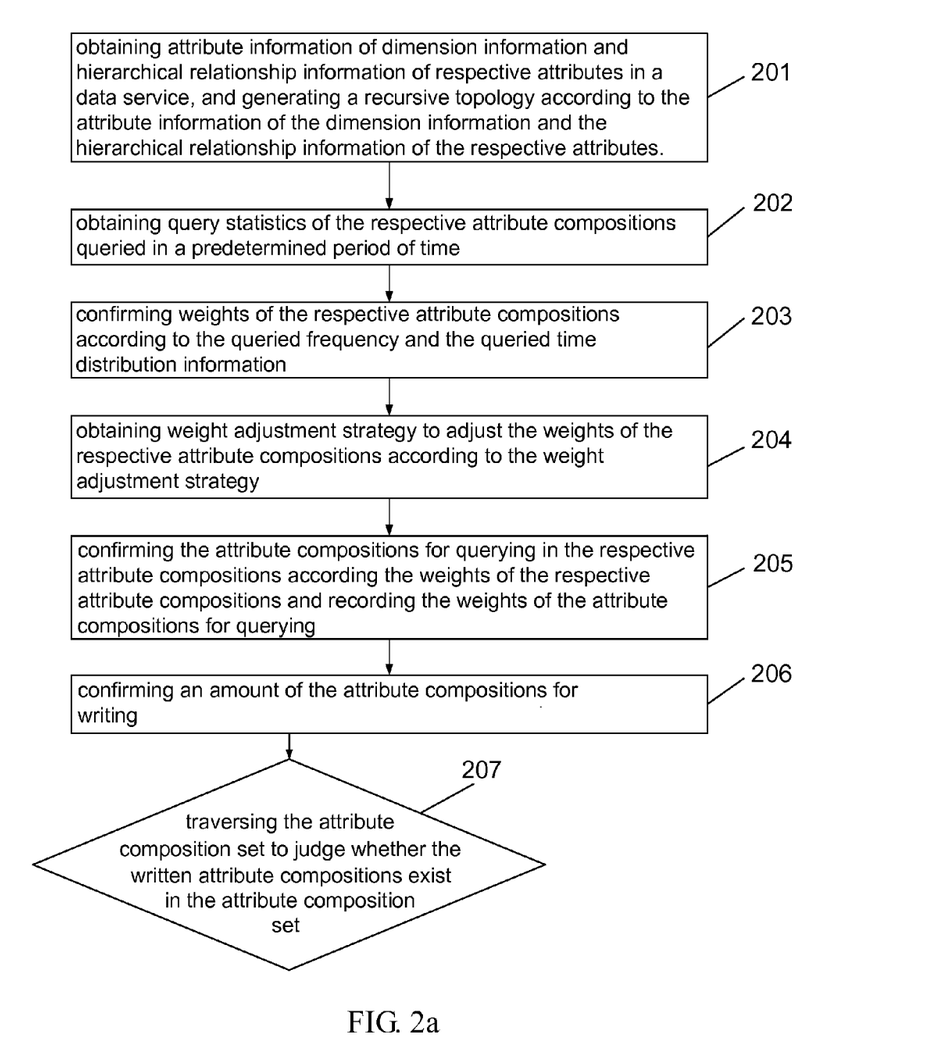
FIG. 2a to FIG. 2c are a flow chart illustrating a whole multidimensional data process method provided by another embodiment of the present invention.
Figure 2B:
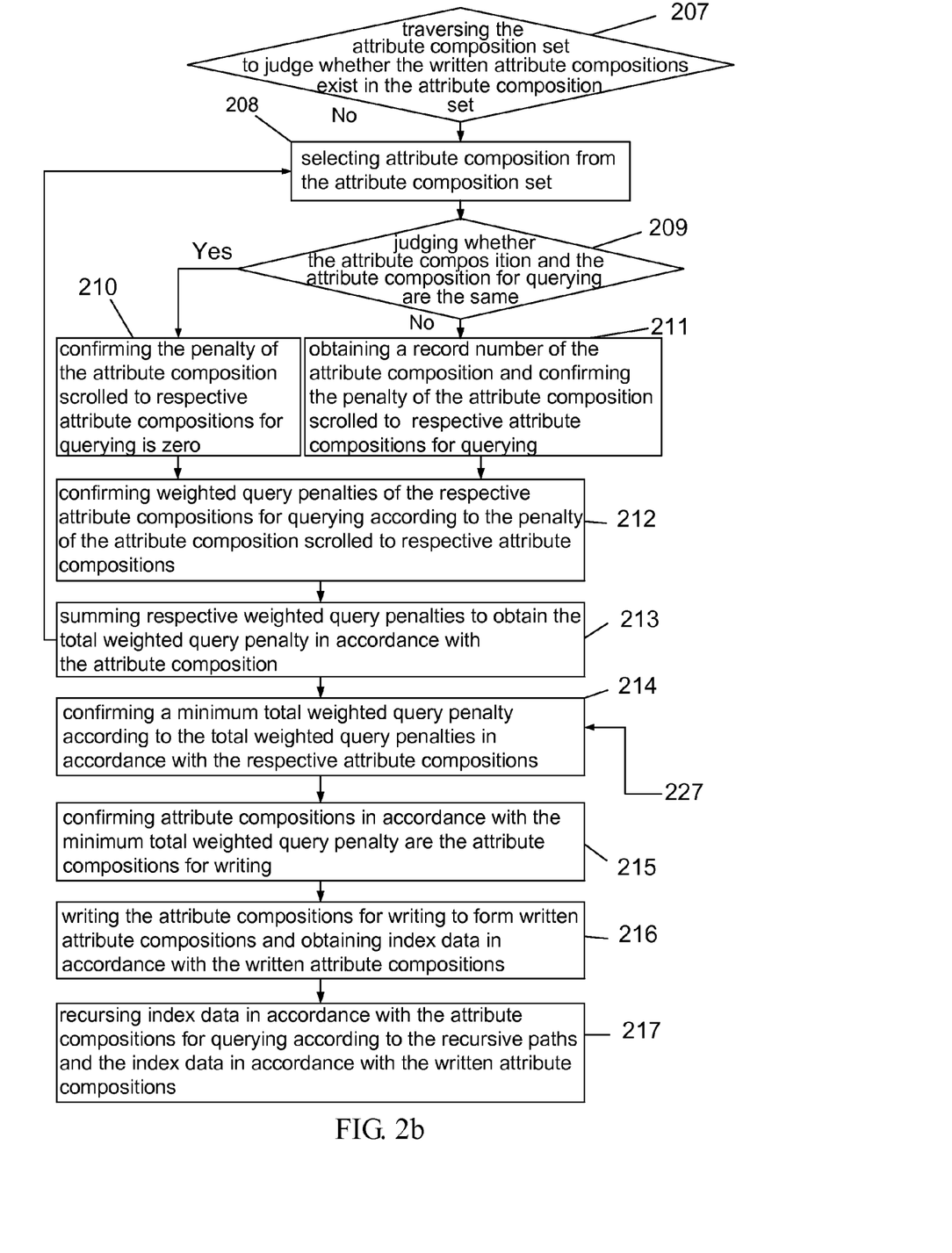
Figure 2C:
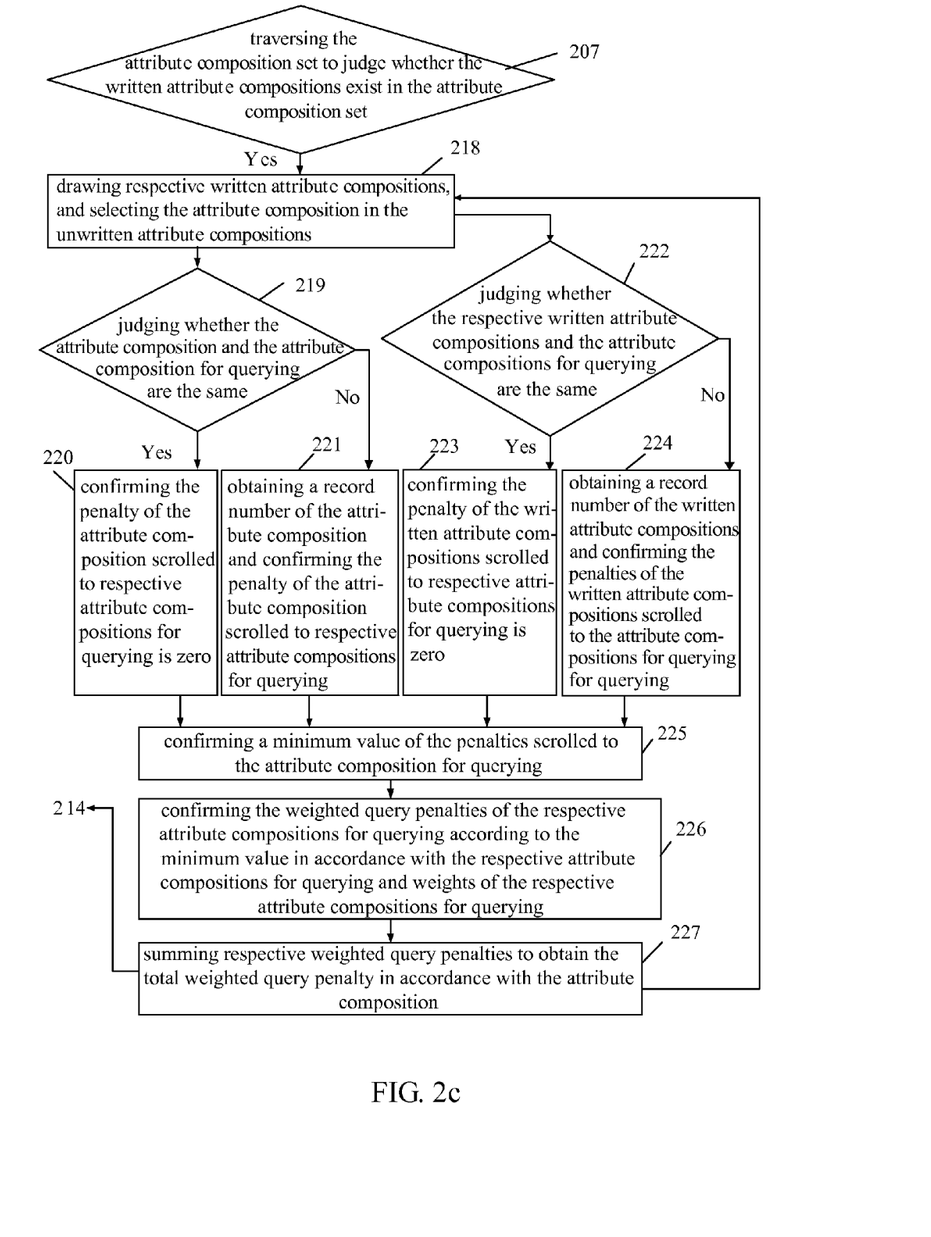

Another embodiment which is more specific is illustrated below. As shown in FIG. 2a to FIG. 2c, the multidimensional data process method provided by another embodiment of the present invention comprises:

201. obtaining attribute information in dimension information and hierarchical relationship information of respective attributes in a data service, and generating a recursive topology according to the attribute information in the dimension information and the hierarchical relationship information of the respective attributes.

Figure 3:
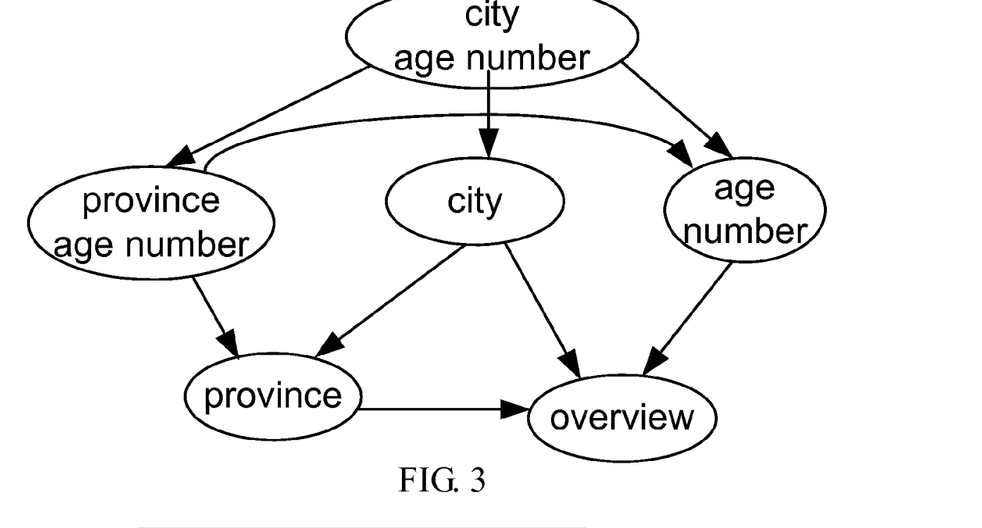
FIG. 3 is one recursive topology diagram according to an embodiment of the present invention.

The recursive topology comprises an attribute composition set and recursive paths of respective attribute compositions in the attribute composition set. The recursive topology can be employed for recursing index data in accordance with the attribute compositions for querying according to index data in accordance with the fixed attribute compositions in the recursive topology as querying the attribute compositions for querying. In a multidimensional data analysis, the attribute composition is generally composed by attributes of multi-dimensions. The dimension is considered as an angle of analyzing data. The attribute information is the scale of describing the dimension in the same dimension, such as a time dimension which can comprises day, week, month year and et cetera. The hierarchical relationship information of the respective attributes comprises hierarchical relationships of the respective attributes. For instance, as shown in FIG. 3, a simple example of the recursive topology is illustrated. In the recursive topology, only two dimensions, the dimension of district and the dimension of age, exist. The attributes in the district dimension are: city and province. Merely one attribute in the age dimension: age number. Specifically, the top attribute composition is the city, age number attribute composition. With scrolling operation, the obtained attribute composition is the province, age number attribute composition, city attribute, age number attribute, and then the province, age number attribute composition can be keep up scrolling to obtain the province attribute and the age number attribute. Similarly, the city attribute can be scrolled to obtain the province attribute and the overview attribute; the age number attribute can be scrolled to obtain to obtain the overview attribute; the province attribute can be scrolled to obtain to obtain the overview attribute. No dimension of district and dimension of age exist in the final overview attribute, i.e. there will be no limitations to the attribute compositions.

202. obtaining query statistics of the respective attribute compositions queried in a predetermined period of time.

The query statistics comprise queried frequencies and queried time distribution information of the respective attribute compositions in the predetermined period of time. The predetermined period of time can be decided on demands. For instance, it can be a week, a month, a year and etcetera before now but not limited thereto. The queried frequencies can be indicated by the querying numbers in the predetermined period of time. For example, some attribute composition is queried 100 times in a month or the like. The queried time distribution information shows the distribution of the queries in the predetermined period of time. For example, the predetermined period of time is one week. In this week, some attribute composition is queried 1000 times from Monday to Friday but queried 9000 times on Saturday and Sunday. Accordingly, the queried conditions of the respective attribute compositions in a certain period of time from now can be predicted according to the queried frequencies and the queried time distribution information of the respective attribute compositions in the predetermined period of time. Because the query statistics of the respective attribute compositions may vary faster in different periods of time, a certain frequency can be scheduled to obtain the respective attribute compositions to adapt the possible changes of the query statistics.

203. confirming weights of the respective attribute compositions according to the queried frequencies and the queried time distribution information.

The weights of the respective attribute compositions can be confirmed according to the queried frequencies without the effect of the queried time distribution information. For instance, the higher the queried frequencies are, the larger the weights become. Under the effect of the queried time distribution information, the queried frequencies and the queried time distribution information can be combined to confirm the weight of the attribute composition. For example, in the aforesaid one week, some attribute composition is queried 1000 times from Monday to Friday but queried 9000 times on Saturday and Sunday. If the queried time of the attribute compositions for querying is on Saturday and Sunday, the weight of the attribute composition needs to be confirmed not only by the frequency of 10000 times a week but also raising the frequency accordingly thereto.

204. obtaining a weight adjustment strategy to adjust the weights of the respective attribute compositions according to the weight adjustment strategy.

Besides, after the weights of the respective attribute compositions are confirmed, the weight adjustment strategy can be obtained. The weight adjustment strategy is employed for adjusting the weights of the respective attribute compositions. The weights have to be adjusted according to the weight adjustment strategy because deviations may exist for the weights of the respective attribute compositions confirmed in Step 203. As an illustration, the weight of some attribute composition in the respective attribute compositions is higher but the some attribute in the attribute composition has been deleted during the system maintenance and the attribute composition cannot be queried anymore, then the weight of the attribute composition can be directly set as zero. The weight adjustment strategy also can comprise weight confirmation strategy for adjusting the weighting means of the respective attribute compositions, such as increasing the contents of effecting weights.

205. confirming the attribute compositions for querying in the respective attribute compositions according the weights of the respective attribute compositions and recording the weights of the attribute compositions for querying.

The attribute composition for querying in the respective attribute compositions can be confirmed from large to small by weight to obtain the attribute composition with a predetermined amount. Alternatively, the attribute compositions which the weights are larger than a predetermined threshold value can be confirmed as attribute compositions for querying.

206. confirming an amount of the attribute compositions for fixing.

The amount of the attribute compositions for fixing can be confirmed based on the capability of the data base storing the fixed attribute compositions and necessary service quality standard. For instance, the amount of the attribute compositions for fixing is 50 if the data base only can store 50 fixed attribute compositions. With permission of allowing the capability of data base storing the fixed attribute compositions, the amount of the attribute compositions for fixing can be larger.

207. traversing the attribute composition set to judge whether the fixed attribute compositions exist in the attribute composition set.

If that the fixed attribute compositions do not exist in the attribute composition set is judged, Step 208 is executed. Otherwise, if that the fixed attribute compositions exist in the attribute composition set is judged, Step 218 is executed.

208. selecting attribute composition from the attribute composition set.

209. judging whether the attribute composition and the attribute composition for querying are the same.

If the attribute compositions and the attribute compositions for querying are the same, Step 210 is executed. If the attribute compositions and the attribute compositions for querying are not the same, Step 211 is executed.

210. confirming the penalty of the attribute composition scrolled to respective attribute compositions for querying is zero.

211. obtaining a record number of the attribute composition and confirming the penalty of the attribute composition scrolled to respective attribute compositions for querying. After Step 211, Step 212 is continued to be executed.

In general, the scrolled calculation elapsed time is proportional to the record number of the parent attribute. The elapsed time is larger and the scrolled calculation elapsed time does the same. Therefore, the penalty scrolled to respective attribute compositions for querying is proportional to the record number. Here, the record number can be considered as an indicator of the penalty.

The record number of the attribute composition can be confirmed by equation 1:

$$N = K_{A^*} \cdot \Pi_{A \in A^*} \cdot P_A$$

N is the record number. $A^*$ indicates the respective attributes in the attribute composition. $P_A$ indicates the number of all different values. $K^{A^*}$ is the deteriorating coefficient for correcting the difference between the estimation caused by error of partial values and the real values and accordingly accuracy of confirming the record number can be raised. For example, $A^*$ indicates that the respective attributes in the attribute composition are attribute 1, attribute 2 and attribute 3. The attribute 1 has two values. The attribute 2 has two values. The attribute 3 has thirty values. Under circumstance that no deterioration exist, the record number is 2*2*30, 120. The value range of $K^{A^*}$ is (0, 1]. For example, the value of $K^{A^*}$ is 0.8. The aforesaid record number is 0.8*120, 96.

212. confirming weighted query penalties of the respective attribute compositions for querying according to the penalty of the attribute composition scrolled to respective attribute compositions.

For example, the attribute composition is $v_1$. The attribute composition for querying is $x_1$. The weight of $x_1$ is $weight_{x_1}$. The weighted query penalty $C_{x_1}$ of the attribute composition $x_1$ is equation 2:

$$C_{x_1} = weight_{x_1} * \cos t(\{v_1\}, x_1)$$

$\{v_1\}$ is the set merely comprising the attribute composition $v_1$. $\cos t(\{v_1\}, x_1)$ is the penalty of the attribute composition $v_1$ scrolled to the attribute compositions for querying $x_1$ and can be indicated by the record number of the attribute composition $v_1$. If the attribute composition $v_1$ and the attribute compositions for querying $x_1$ are the same. That the penalty of the attribute composition $v_1$ scrolled to the attribute compositions for querying $x_1$ is zero can be confirmed.

213. summing respective weighted query penalties to obtain the total weighted query penalty in accordance with the attribute composition. After Step 213, with returning back and executing Step 208, the total weighted query penalties in accordance with the respective attribute compositions are obtained. Then, Step 214 is executed.

For example, the attribute composition is $v_1$. The attribute composition for querying is x. x comprises $x_1$, $x_2$ and $x_3$. The total weighted query penalty $C_1$ in accordance with the attribute composition $v_1$ can be indicated by equation 3:

$$C_1 = \Sigma_{x \in t\_views} weight_x * \cos t(\{v_1\}, x)$$

In $\{v_1\}$ set here, merely is the attribute composition $v_1$. t_views represents the set of the attribute compositions for querying, which many attribute compositions for querying are allowed. The $weight_x$ represent weights in accordance with the attribute compositions for querying x. $(\{v_1\}, x_1)$ is the penalty of the attribute composition $v_1$ scrolled to the attribute compositions for querying x. x can be valued as $x_1$, $x_2$, $x_3$ and et cetera.

Besides, according to equation 3, the respective total weighted query penalties $C_2$, $C_3$, $C_4$ and et cetera can be obtained accordingly when the attribute compositions are $v_2$, $v_3$, $v_4$ and et cetera.

214. confirming a minimum total weighted query penalty according to the total weighted query penalties in accordance with the respective attribute compositions.

For example, a minimum total weighted query penalty can be obtained after the total weighted penalties $C_1$, $C_2$, $C_3$, $C_4$ and et cetera.

215. confirming attribute compositions in accordance with the minimum total weighted query penalty are the attribute compositions for fixing.

216. fixing the attribute compositions for fixing to form fixed attribute compositions and obtaining index data in accordance with the fixed attribute compositions.

The preferable attribute compositions for fixing have been confirmed according to the attribute compositions for querying. Then, the fixed attribute compositions are formed and the index data in accordance with the fixed attribute compositions is obtained from the stream-oriented data. When asking the index data in accordance with the attribute compositions for querying, the index data can be recursed according to the index data in accordance with the fixed attribute compositions. The step of recursing index data in accordance with the attribute compositions for querying according to the recursive paths and the index data in accordance with the fixed attribute compositions can be triggered when the querying instruction is received but not limited to the present invention.

217. recursing index data in accordance with the attribute compositions for querying according to the recursive paths and the index data in accordance with the fixed attribute compositions.

218. drawing respective fixed attribute compositions and selecting an attribute composition in the unfixed attribute compositions. After Step 218, Steps 219 and 222 are executed.

The unfixed attribute compositions are in the attribute composition set. If the fixed attribute compositions exist in the attribute composition set, the fixed attribute composition will affect the total weighted penalty obtained thereafter. Therefore, the respective fixed attribute compositions need to be drawn.

219. judging whether the attribute composition and the attribute composition for querying are the same. If that the attribute composition and the attribute compositions for querying are the same is judged, then Step 220 is executed. If that the attribute composition and the attribute compositions for querying are not the same is judged, then Step 221 is executed.

220. confirming the penalty of the attribute composition scrolled to respective attribute compositions for querying is zero. Step 225 is executed after Step 220.

221. obtaining a record number of the attribute composition and confirming the penalty of the attribute composition scrolled to respective attribute compositions for querying. Step 225 is executed after Step 221.

222. judging whether the respective fixed attribute compositions and the attribute compositions for querying are the same. If that the fixed attribute compositions and the attribute compositions for querying are the same is judged, then Step 223 is executed. If that the fixed attribute compositions and the attribute compositions for querying are not the same is judged, then Step 224 is executed.

223. confirming the penalty of the fixed attribute composition scrolled to respective attribute compositions for querying is zero. Step 225 is executed after Step 223.

224. obtaining a record number of the fixed attribute compositions and confirming the penalties of the fixed attribute compositions scrolled to the attribute compositions for querying for querying. Step 225 is executed after Step 224.

The specific implement can be referred to the specific implement of Step 211. Here, the details are not repeated.

225. confirming a minimum value of the penalties scrolled to the attribute composition for querying.

For example, m_views indicates the fixed attribute composition set. x represents the attribute composition for querying. $v_1$ represents a selected attribute composition. The minimum value of the penalties of the attribute compositions for querying is equation 4:

$$\cos t(m\_views \cup = \min_{a \in m\_views \cup} r(a,x)$$

$\{v_1\}$ is the set merely comprising the attribute composition $v_1$. $\cos t(m\_views \cup \{v_1\}, x)$ represents the minimum value of the penalties of the attribute compositions for querying confirmed under the circumstance $v_1$. $a \in m\_views \cup \{v_1\}$ represents that a is in the union of the fixed attribute composition set and the $\{v_1\}$ set, i.e. a can be the attribute composition $v_1$, or a fixed attribute composition. r (a, x) represents the penalty of the attribute composition scrolled to the attribute composition x. x can be valued as $x_1$, $x_2$, $x_3$ and et cetera. Accordingly, the minimum value in accordance with the respective attribute compositions for querying can be obtained.

226. confirming the weighted query penalties of the respective attribute compositions for querying according to the minimum value in accordance with the respective attribute compositions for querying and weights of the respective attribute compositions for querying.

For example, the attribute composition is $v_1$. The attribute composition for querying is $x_1$. The weight of $x_1$ is $weight_{x1}$. The weighted query penalty $C_{x1}$ of the attribute composition $x_1$ is equation 5:

$$C_{x1} = weight_{x1} * \cos t(m\_views \cup$$

$\cos t(m\_views \cup \{v_1\}, x_1)$ is the minimum value of the penalties in the union of the fixed attribute composition set and the $\{v_1\}$ set scrolled to the attribute compositions for querying $x_1$. In $\{v_1\}$ set here, merely is the attribute composition $v_1$.

227. summing respective weighted query penalties to obtain the total weighted query penalty in accordance with the attribute composition. After Step 227, with returning back and executing Step 218, the total weighted query penalties in accordance with the respective attribute compositions are obtained. Then, Step 214 is executed.

For example, the attribute composition is $v_1$. The attribute composition for querying is x. x comprises $x_1$, $x_2$ and $x_3$. The total weighted query penalty $C_1$ in accordance with the attribute composition $v_1$ can be indicated by equation 6:

$$C_1 = \Sigma_{x \in t\_views} weight_x * \cos t(m\_views \cup$$

t_views represents the set of the attribute compositions for querying and, which many attribute compositions for querying are allowed. The $weight_x$ represent weights in accordance with the attribute compositions for querying x. $\cos t(m\_views \cup \{v_1\}, x)$ is the minimum value of the penalties in the union of the fixed attribute composition set and the $\{v_1\}$ set scrolled to the attribute compositions for querying x. x can be valued as $x_1$, $x_2$, $x_3$ and et cetera. Besides, according to equation 3, the respective total weighted query penalties $C_2$, $C_3$, $C_4$ and et cetera can be obtained accordingly when the attribute compositions are $v_2$, $v_3$, $v_4$ and et cetera. For example, a minimum total weighted query penalty can be obtained after the total weighted penalties $C_1$, $C_2$, $C_3$, $C_4$ and et cetera.

Significantly, the executing subject of the multidimensional data process method provided by another embodiment of the present invention can be a multidimensional data process device. The multidimensional data process device can function on electronic equipments, such as computers, network servers and et cetera but not limited thereto.

According to the multidimensional data process method and the device thereof provided by the another embodiment of the present invention, the attribute compositions for querying are confirmed and the attribute compositions for fixing are confirmed with the attribute compositions for querying. The attribute compositions for fixing are fixed to form fixed attribute compositions. The index data in accordance with the fixed attribute compositions is obtained from the stream-oriented data. Accordingly, the index data in accordance with the attribute compositions for querying is obtained by recursing the index data in accordance with the attribute compositions for querying according to the generated recursive topology rather than obtaining from the stream-oriented data. The computing cost is lower and the computing complexity is lower, too. In prior art, the index data is obtained from the stream-oriented data each time.

Therefore, both the computing cost and complexity are high. Thus, the present invention is capable of solving issues that the computing cost and complexity are high because the index data of respective attribute compositions are obtained based on the stream-oriented data.

Figure 4:
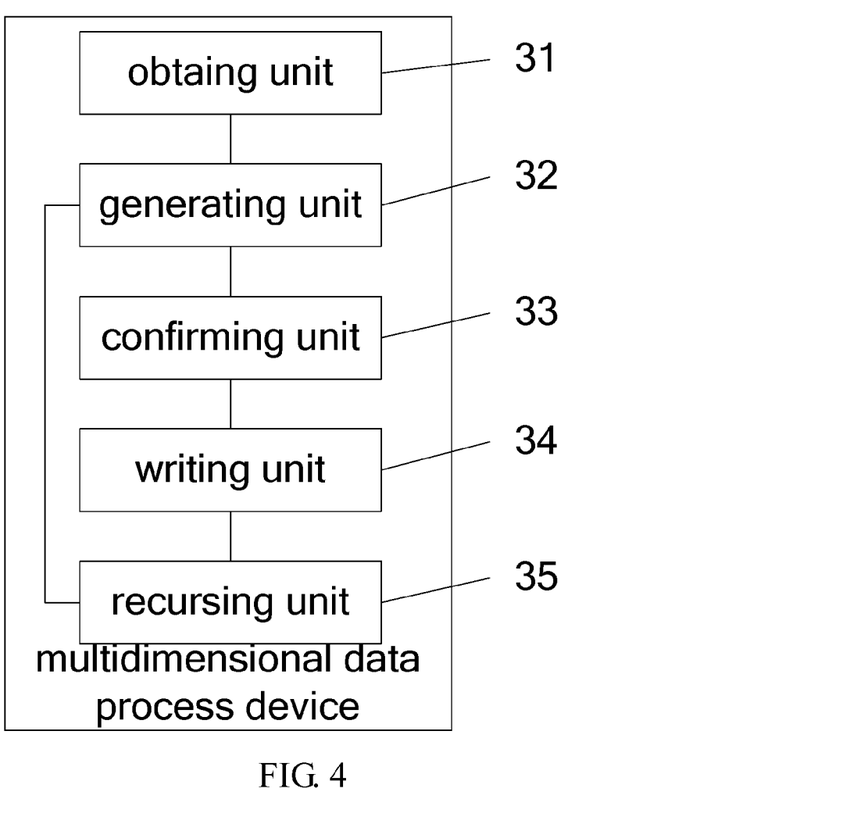
FIG. 4 is a first schematic diagram of a multidimensional data process device of the present invention.

Corresponding to the embodiment of the multidimensional data process method shown in FIG. 1 and FIG. 2a to FIG. 2c, as shown in FIG. 4, the multidimensional data process device comprises:

an obtaining unit 31, obtaining attribute information in dimension information and hierarchical relationship information of respective attributes in a data service;

a generating unit 32, generating a recursive topology according to the attribute information in the dimension information and the hierarchical relationship information of the respective attributes obtained by the obtaining unit; and the recursive topology comprises an attribute composition set and recursive paths of respective attribute compositions in the attribute composition set;

a confirming unit 33, confirming attribute compositions for querying in the attribute composition set generated by the generating unit;

the confirming unit 33, is also employed for confirming attribute compositions for fixing in the attribute composition set according to the attribute compositions for querying;

a fixing unit 34, fixing the attribute compositions for fixing confirmed by the confirming unit to form fixed attribute compositions and obtaining index data in accordance with the fixed attribute compositions;

a recursing unit 35, recursing index data in accordance with the attribute compositions for querying according to the recursive paths generated by the generating unit and the index data in accordance with the fixed attribute compositions fixed by the fixing unit.

Figure 5:
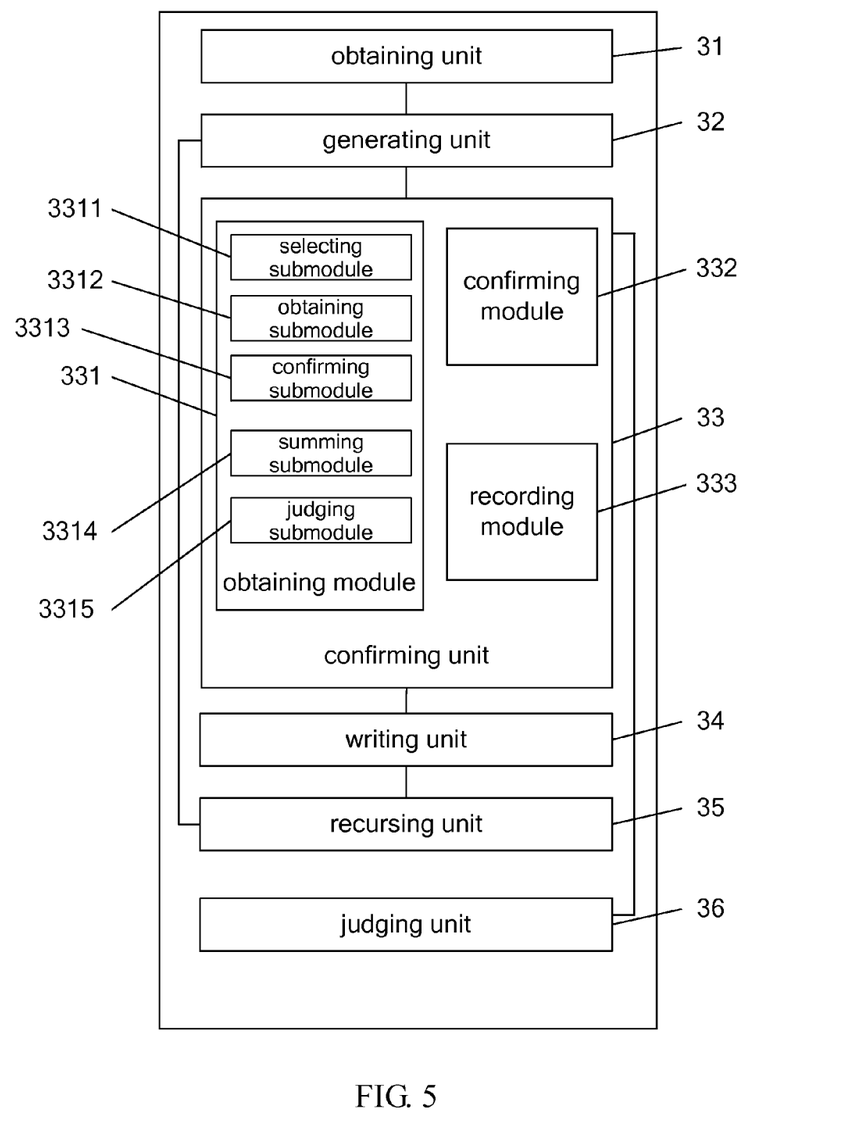
FIG. 5 is a second schematic diagram of a multidimensional data process device of the present invention.

Furthermore, as shown in FIG. 5, the confirming unit 33 further comprises:

an obtaining module 331, obtaining query statistics of the respective attribute compositions queried in a predetermined period of time.

The query statistics comprise queried frequencies and queried time distribution information of the respective attribute compositions in the predetermined period of time.

a confirming module 332, confirming weights of the respective attribute compositions according to the queried frequencies and the queried time distribution information.

The confirming module 332 is also employed for confirming the attribute compositions for querying in the respective attribute compositions according the weights of the respective attribute compositions.

a recording module 333, recording the weights of the attribute compositions for querying.

Furthermore, as shown in FIG. 5, the obtaining unit 31 is further employed for:

obtaining a weight adjustment strategy to adjust the weights of the respective attribute compositions according to the weight adjustment strategy.

Furthermore, as shown in FIG. 5, the confirming unit 33 is further employed for:

confirming an amount of the attribute compositions for fixing.

Furthermore, as shown in FIG. 5, the obtaining module 331 is further employed for:

obtaining total weighted query penalties in accordance with the respective attribute compositions in the attribute composition set.

The confirming module 332 is also employed for confirming a minimum total weighted query penalty according to the total weighted query penalty penalties in accordance with the respective attribute compositions.

The confirming module 332 is also employed for confirming that attribute compositions in accordance with the minimum total weighted query penalty are the attribute compositions for fixing.

Specifically, as shown in FIG. 5, the multidimensional data process device further comprises: a judging unit 36, traversing the attribute composition set to judge whether the fixed attribute compositions exist in the attribute composition set.

Specifically, as shown in FIG. 4, the obtaining module 331 comprises:

a selecting submodule 3311, selecting an attribute composition from the attribute composition set if that the fixed attribute compositions do not exist in the attribute composition set is judged by the judging unit;

an obtaining submodule 3312, obtaining a penalty of the attribute composition scrolled to respective attribute compositions for querying;

a confirming submodule 3313, confirming weighted query penalties of the respective attribute compositions for querying according to the penalty of the attribute composition scrolled to respective attribute compositions for querying and weights of the respective attribute compositions for querying;

a summing submodule 3314, summing respective weighted query penalties to obtain the total weighted query penalty in accordance with the attribute composition.

As shown in FIG. 5, the obtaining module 331 further comprises:

a judging submodule 3315, judging whether the attribute composition and the attribute composition for querying are the same.

Specifically, the obtaining submodule 3315 is employed for:

confirming the penalty of the attribute composition scrolled to respective attribute compositions for querying is zero if that the attribute composition and the attribute composition for querying are the same is judged;

obtaining a record number of the attribute composition and confirming the penalty of the attribute composition scrolled to respective attribute compositions for querying if that the attribute composition and the attribute composition for querying are not the same is judged.

As shown in FIG. 5, the selecting submodule 3311 is also employed for drawing respective fixed attribute compositions, and selecting an attribute composition in the unfixed attribute compositions if that the fixed attribute compositions exist in the attribute composition set is judged by the judging unit 36. The unfixed attribute compositions are in the attribute composition set.

The obtaining submodule 3312 is also employed for obtaining penalties of the respective fixed attribute compositions and the attribute composition scrolled to an attribute composition for querying.

The confirming submodule 3313 is also employed for confirming a minimum value of the penalties scrolled to the attribute composition for querying.

The confirming submodule 3313 is also employed for confirming the weighted query penalties of the respective attribute compositions for querying according to the minimum value in accordance with the respective attribute compositions for querying and weights of the respective attribute compositions for querying.

The summing submodule 3314 is also employed for summing respective weighted query penalties to obtain the total weighted query penalty in accordance with the attribute composition.

The judging submodule 3315 is also employed for judging whether the respective fixed attribute compositions and the attribute composition are the same as the attribute composition for querying.

Specifically, as shown in FIG. 5, the obtaining submodule 3312 is employed for:

confirming the penalty of the attribute composition scrolled to respective attribute compositions for querying is zero if that the attribute composition and the attribute composition for querying are the same is judged.

confirming the penalty of the fixed attribute composition scrolled to respective attribute compositions for querying is zero if that the fixed attribute compositions and the attribute compositions for querying are the same is judged.

obtaining a record number of the attribute composition and confirming the penalty of the attribute composition scrolled to respective attribute compositions for querying if that the attribute composition and the attribute composition for querying are not the same is judged.

obtaining a record number of the fixed attribute compositions and confirming the penalties of the fixed attribute compositions scrolled to the attribute compositions for querying for querying if that the fixed attribute compositions and the attribute compositions for querying are not the same is judged.

Significantly, the executing subject of the data report process device provided by the embodiment of the present invention is a data report process device which can function on electronic equipments but not limited thereto. The specific embodiments of the data report process device can be referred to the data report process method disclosed in FIG. and FIG. 2a to FIG. 2c. The details are not repeated here.

According to the multidimensional data process device provided by the embodiment of the present invention, the attribute compositions for querying are confirmed and the attribute compositions for fixing are confirmed with the attribute compositions for querying. The attribute compositions for fixing are fixed to form fixed attribute compositions. The index data in accordance with the fixed attribute compositions is obtained from the stream-oriented data. Accordingly, the index data in accordance with the attribute compositions for querying is obtained by recursing the index data in accordance with the attribute compositions for querying according to the generated recursive topology rather than obtaining from the stream-oriented data. The computing cost is lower and the computing complexity is lower, too. In prior art, the index data is obtained from the stream-oriented data each time. Therefore, both the computing cost and complexity are high. Thus, the present invention is capable of solving issues that the computing cost and complexity are high because the index data of respective attribute compositions are obtained based on the stream-oriented data. Through the above description of the embodiments, persons those who are skilled in the art can clearly understand that the present invention may be achieved by means of software with a necessary universal hardware. Certainly, implementation by hardware also can be an embodiment but the former should be better under many of circumstances. Based on this understanding, the technical solution of the present invention in essence or the contributing part to the prior arts may be embodied in the form of software product. The computer software product are stored in a readable storage medium such as a computer's floppy, a hard disk or an optical disk, including several instructions for making a computer device (may be a personal computer, a server, or network equipment) to perform the method described in the embodiments of the present invention.

Above are only specific embodiments of the present invention, the scope of the present invention is not limited to this, and to any persons who are skilled in the art, change or replacement which is easily derived should be covered by the protected scope of the invention. Thus, the protected scope of the invention should go by the subject claims.

What is claimed is:

1. A multidimensional data process method, comprising:
   obtaining attribute information in dimension information and hierarchical relationship information of respective attributes in a data service;
   generating a recursive topology according to the attribute information in the dimension information and the hierarchical relationship information of the respective attributes; and the recursive topology comprising an attribute composition set and recursive paths of respective attribute compositions in the attribute composition set;
   confirming attribute compositions for querying in the attribute composition set, including:
      obtaining query statistics of the respective attribute compositions queried in a predetermined period of time, the query statistics including queried frequencies and queried time distribution information of the respective attribute compositions in the predetermined period of time;
      confirming weights of the respective attribute compositions according to the queried frequencies and the queried time distribution information; and
      confirming the attribute compositions for querying in the respective attribute compositions according the weights of the respective attribute compositions and recording the weights of the attribute compositions for querying;
   confirming attribute compositions for fixing in the attribute composition set according to the attribute compositions for querying;
   fixing the attribute compositions for fixing to form fixed attribute compositions and obtaining index data in accordance with the fixed attribute compositions;
   recursing index data in accordance with the attribute compositions for querying according to the recursive paths and the index data in accordance with the fixed attribute compositions.

2. The method according to claim 1, wherein the step of confirming the attribute compositions for querying in the respective attribute compositions according the weights of the respective attribute compositions comprises:
   obtaining a weight adjustment strategy to adjust the weights of the respective attribute compositions according to the weight adjustment strategy.

3. The method according to claim 1, wherein before the step of confirming the attribute compositions for fixing in the attribute composition set according to the attribute compositions for querying, the method comprises:
   confirming an amount of the attribute compositions for fixing.

4. The method according to claim 1, wherein the step of confirming the attribute compositions for fixing in the attribute composition set according to the attribute compositions for querying comprises:
   obtaining total weighted query penalties in accordance with the respective attribute compositions in the attribute composition set;

confirming a minimum total weighted query penalty according to the total weighted query penalty penalties in accordance with the respective attribute compositions;

confirming that attribute compositions in accordance with the minimum total weighted query penalty are the attribute compositions for fixing.

5. The method according to claim 4, wherein before the step of obtaining the total weighted query penalties in accordance with the respective attribute compositions in the attribute composition set, the method comprises:

traversing the attribute composition set to judge whether the fixed attribute compositions exist in the attribute composition set.

6. The method according to claim 5, wherein the step of obtaining the total weighted query penalties in accordance with the respective attribute compositions in the attribute composition set comprises:

selecting an attribute composition from the attribute composition set if that the fixed attribute compositions do not exist in the attribute composition set is judged;

obtaining a penalty of the attribute composition scrolled to respective attribute compositions for querying;

confirming weighted query penalties of the respective attribute compositions for querying according to the penalty of the attribute composition scrolled to respective attribute compositions for querying and weights of the respective attribute compositions for querying;

summing respective weighted query penalties to obtain the total weighted query penalty in accordance with the attribute composition.

7. The method according to claim 6, wherein before the step of obtaining the penalty of the attribute composition scrolled to respective attribute compositions for querying, the method comprises:

judging whether the attribute composition and the attribute composition for querying are the same.

8. The method according to claim 7, the step of obtaining the penalty of the attribute composition scrolled to respective attribute compositions for querying comprises:

confirming the penalty of the attribute composition scrolled to respective attribute compositions for querying is zero if that the attribute composition and the attribute composition for querying are the same is judged;

obtaining a record number of the attribute composition and confirming the penalty of the attribute composition scrolled to respective attribute compositions for querying if that the attribute composition and the attribute composition for querying are not the same is judged.

9. The method according to claim 5, wherein the step of obtaining the total weighted query penalties in accordance with the respective attribute compositions in the attribute composition set further comprises:

drawing respective fixed attribute compositions, and selecting an attribute composition in the unfixed attribute compositions if that the fixed attribute compositions exist in the attribute composition set; the unfixed attribute compositions are in the attribute composition set;

obtaining penalties of the respective fixed attribute compositions and the attribute composition scrolled to an attribute composition for querying;

confirming a minimum value of the penalties scrolled to the attribute composition for querying;

confirming the weighted query penalties of the respective attribute compositions for querying according to the minimum value in accordance with the respective attribute compositions for querying and weights of the respective attribute compositions for querying;

summing respective weighted query penalties to obtain the total weighted query penalty in accordance with the attribute composition.

10. The method according to claim 9, wherein before the step of obtaining the penalties of the respective fixed attribute compositions and the attribute composition scrolled to an attribute composition for querying, the method comprises:

judging whether the respective fixed attribute compositions and the attribute composition are the same as the attribute composition for querying.

11. The method according to claim 10, wherein the step of obtaining penalties of the respective fixed attribute compositions and the attribute composition scrolled to an attribute composition for querying comprises:

confirming the penalty of the attribute composition scrolled to respective attribute compositions for querying is zero if that the attribute composition and the attribute composition for querying are the same is judged;

confirming the penalty of the fixed attribute composition scrolled to respective attribute compositions for querying is zero if that the fixed attribute compositions and the attribute compositions for querying are the same is judged;

obtaining a record number of the attribute composition and confirming the penalty of the attribute composition scrolled to respective attribute compositions for querying if that the attribute composition and the attribute composition for querying are not the same is judged;

obtaining a record number of the fixed attribute compositions and confirming the penalties of the fixed attribute compositions scrolled to the attribute compositions for querying for querying if that the fixed attribute compositions and the attribute compositions for querying are not the same is judged.

12. A multidimensional data process device, comprising:
a computer device; and
a storage medium storing instructions that, when executed by the computer device, cause the computer device to:
obtain attribute information in dimension information and hierarchical relationship information of respective attributes in a data service;
generate a recursive topology according to the attribute information in the dimension information and the hierarchical relationship information of the respective attributes; and the recursive topology comprises an attribute composition set and recursive paths of respective attribute compositions in the attribute composition set;
confirm attribute compositions for querying in the attribute composition set, including:
obtaining query statistics of the respective attribute compositions queried in a predetermined period of time, the query statistics including queried frequencies and queried time distribution information of the respective attribute compositions in the predetermined period of time;
confirming weights of the respective attribute compositions according to the queried frequencies and the queried time distribution information; and
confirming the attribute compositions for querying in the respective attribute compositions according the weights of the respective attribute compositions and recording the weights of the attribute compositions for querying;

confirm attribute compositions for fixing in the attribute composition set according to the attribute compositions for querying;

fix the attribute compositions for fixing to form fixed attribute compositions and obtaining index data in accordance with the fixed attribute compositions;

recurse index data in accordance with the attribute compositions for querying according to the recursive paths and the index data in accordance with the fixed attribute compositions.

13. The device according to claim 12, wherein the instructions further cause the computer device to:

obtain a weight adjustment strategy to adjust the weights of the respective attribute compositions according to the weight adjustment strategy.

14. The device according to claim 12, wherein the instructions further cause the computer device to:

confirm an amount of the attribute compositions for fixing.

15. The device according to claim 12, wherein the instructions further cause the computer device to:

obtain total weighted query penalties in accordance with the respective attribute compositions in the attribute composition set;

confirm a minimum total weighted query penalty according to the total weighted query penalty penalties in accordance with the respective attribute compositions;

confirm attribute compositions in accordance with the minimum total weighted query penalty are the attribute compositions for fixing.

16. The device according to claim 15, wherein the instructions further cause the computer device to:

traverse the attribute composition set to judge whether the fixed attribute compositions exist in the attribute composition set.

17. The device according to claim 16, wherein the instructions further cause the computer device to:

select attribute composition from the attribute composition set if that the fixed attribute compositions do not exist in the attribute composition set is judged;

obtain a penalty of the attribute composition scrolled to respective attribute compositions for querying;

confirm weighted query penalties of the respective attribute compositions for querying according to the penalty of the attribute composition scrolled to respective attribute compositions for querying and weights of the respective attribute compositions for querying;

sum respective weighted query penalties to obtain the total weighted query penalty in accordance with the attribute composition.

18. The device according to claim 17, wherein the instructions further cause the computer device to:

judge whether the attribute composition and the attribute composition for querying are the same;

confirm the penalty of the attribute composition scrolled to respective attribute compositions for querying is zero if that the attribute composition and the attribute composition for querying are the same is judged;

obtain a record number of the attribute composition and confirming the penalty of the attribute composition scrolled to respective attribute compositions for querying if that the attribute composition and the attribute composition for querying are not the same is judged.

19. The device according to claim 16, wherein the instructions further cause the computer device to:

draw respective fixed attribute compositions, and select an attribute composition in the unfixed attribute compositions if that the fixed attribute compositions exist in the attribute composition set is judged by the judging unit; the unfixed attribute compositions are in the attribute composition set;

obtain penalties of the respective fixed attribute compositions and the attribute composition scrolled to an attribute composition for querying;

confirm a minimum value of the penalties scrolled to the attribute composition for querying;

confirm the weighted query penalties of the respective attribute compositions for querying according to the minimum value in accordance with the respective attribute compositions for querying and weights of the respective attribute compositions for querying;

sum respective weighted query penalties to obtain the total weighted query penalty in accordance with the attribute composition.

20. The device according to claim 19, wherein the instructions further cause the computer device to:

judge whether the respective fixed attribute compositions and the attribute composition are the same as the attribute composition for querying;

confirm the penalty of the attribute composition scrolled to respective attribute compositions for querying is zero if that the attribute composition and the attribute composition for querying are the same is judged;

confirm the penalty of the fixed attribute composition scrolled to respective attribute compositions for querying is zero if that the fixed attribute compositions and the attribute compositions for querying are the same is judged;

obtain a record number of the attribute composition and confirming the penalty of the attribute composition scrolled to respective attribute compositions for querying if that the attribute composition and the attribute composition for querying are not the same is judged;

obtain a record number of the fixed attribute compositions and confirming the penalties of the fixed attribute compositions scrolled to the attribute compositions for querying for querying if that the fixed attribute compositions and the attribute compositions for querying are not the same is judged.

* * * * *